Sept. 7, 1926. 1,598,979
W. L. MARTIN
BRAKE MECHANISM
Filed April 5, 1923 2 Sheets-Sheet 1
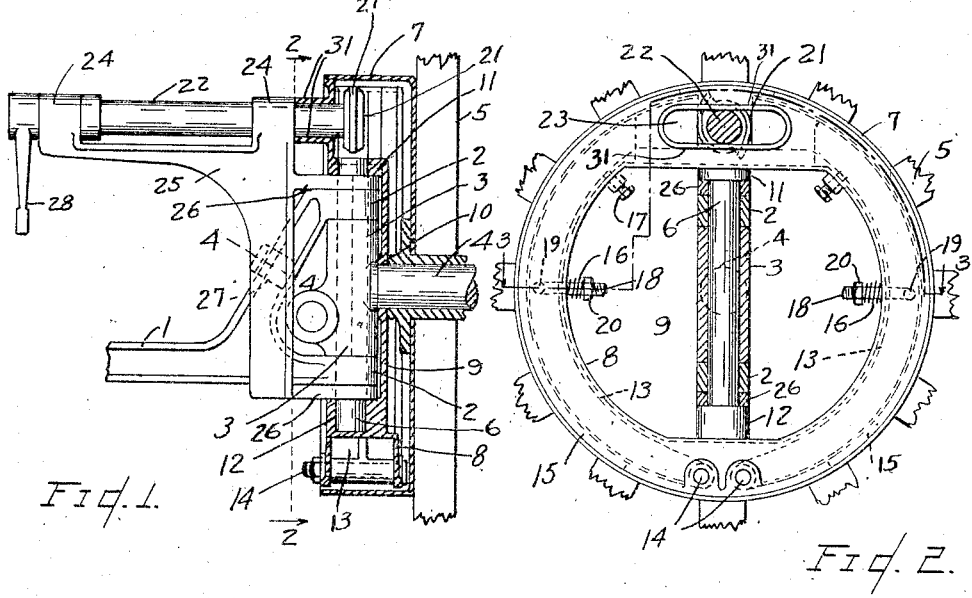
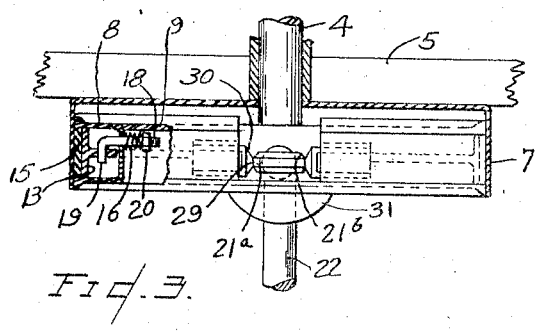
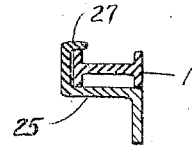
William Lincoln Martin
By Whittemore, Hulbert, Whittemore, & Belknap
Attorney Sept. 7, 1926.
W. L. MARTIN
1,598,979
BRAKE MECHANISM
Filed April 5, 1923    2 Sheets-Sheet 2
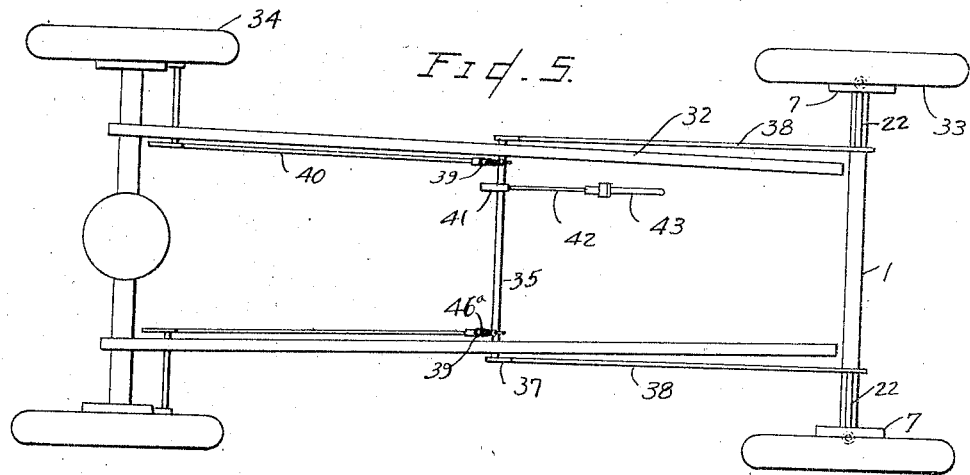
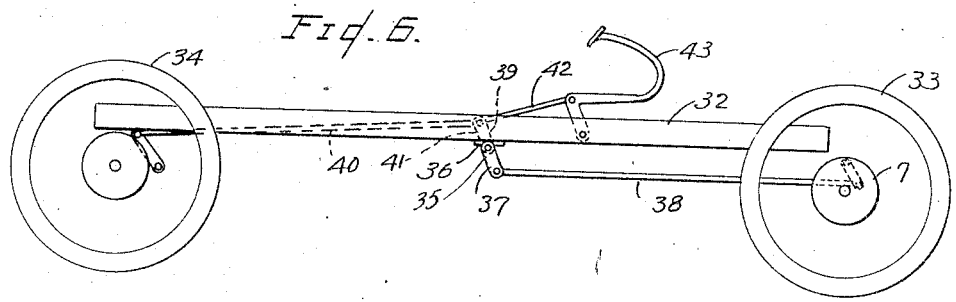
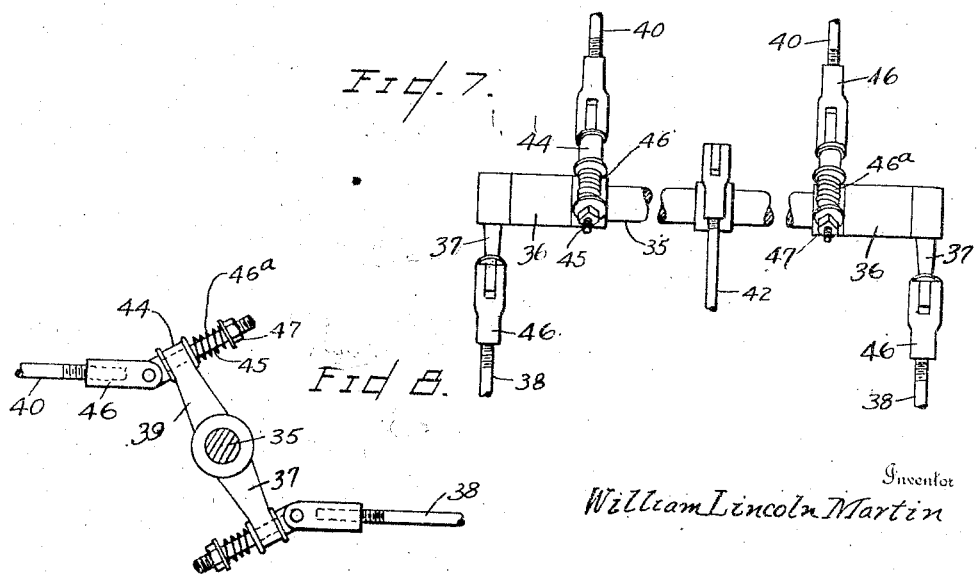
Inventor
William Lincoln Martin
By Whittemore, Hulbert, Whittemore, & Belknap
Attorney Patented Sept. 7, 1926.

1,598,979

UNITED STATES PATENT OFFICE.

WILLIAM LINCOLN MARTIN, OF DETROIT, MICHIGAN, ASSIGNOR TO GENERAL MOTORS CORPORATION, OF DETROIT, MICHIGAN, A CORPORATION OF DELAWARE.

BRAKE MECHANISM.

Application filed April 5, 1923. Serial No. 630,077.

This invention relates to brake mechanisms and more particularly to front wheel brake mechanisms for motor vehicles.

While ordinarily it is desirable to apply a braking force at the front wheels as well as at the rear wheels there is danger in applying front wheel brakes while a vehicle is making a turn since it is necessary that the front wheels rotate freely at such times for steering purposes and the momentum of the vehicle will tend to produce a straight forward motion if steering is interfered with by opposing a braking restraint to rotation of the front wheels.

It is an object of the present invention, therefore, to provide a front wheel brake mechanism for motor vehicles having a provision for automatically effecting a release of the brakes in case they are applied when a turn is being made and also to automatically prevent an application of the brake under such conditions.

A further object of the invention is to provide a braking mechanism for the front wheels of a motor vehicle that may be applied as an attachment to a vehicle originally equipped only with rear wheel brakes.

The invention consists further in an operating mechanism for the front and rear brakes of a motor vehicle that will insure transmission of adequate braking force to each of the wheels.

In the drawings:—

Figure 1 is a vertical sectional view through the front axle of a motor vehicle showing a front wheel brake in accordance with the invention;

Figure 2 is an inside view of said brake mechanism, the same being a section on line 2—2 of Figure 1;

Figure 3 is a horizontal section on line 3—3 of Figure 2;

Figure 4 is a sectional detail on line 4—4 of Figure 1;

Figure 5 is a plan view of the chassis of a vehicle showing the common control means for the brakes of the four wheels;

Figure 6 is a side view of the same;

Figure 7 is an enlarged plan view of a portion of the mechanism;

Figure 8 is a transverse sectional view showing the connections of the pull rods to the actuating rock shaft.

In these views the reference character 1 designates a motor vehicle front axle having the usual forked extremity 2. Between the forks 2 is arranged the vertical sleeve 3 which carries a spindle 4 upon which the wheel 5 is journaled. The sleeve 3 has a swivel connection with the axle by a king-pin 6 passing vertically through the forks 2 and through said sleeve. The invention secures to the wheel 5, in any well known manner, a brake drum 7 and swivels upon the ends of the king pin 6 a brake shoe mounting comprising the channel shaped annulus 8 and the central disk portion 9, the latter having a central opening 10 engaged by the spindle 4. The bearings 11 and 12, which engage the king pin, project oppositely inward from the annulus 8, as is best seen in Figure 2. It will be understood that the original king pin must be replaced by a longer one when the described brake is being applied to a car originally lacking the front wheel brakes. Within the channel shaped annulus 8 there is arranged a pair of complementary substantially semi-circular brake shoes 13, the lower ends of which are adjacently pivoted upon bolts 14 transversely mounted in the annulus 8. The linings of said brake shoes are indicated at 15. Coiled springs 16 respectively act upon said brake shoes urging them clear of the drum 7, the amount of clearance being determined by stop screws 17 which are radially mounted in the annulus 8, projecting regulably into the channel space of said annulus for engagement by the upper portions of the brake shoes. The springs 16 are coiled upon bolts 18 passing radially through the bottom of the annulus 8 and having their outer ends hooked as indicated at 19, to engage the brake shoes, said springs being compressed between the bottom of the annulus and nuts 20 threaded upon the inner ends of said bolts. The upper ends of the brake shoes 13 are spaced to accommodate between said ends a cam 21 mounted fast upon a shaft 22 which passes through a horizontally elongated slot 23 in the inner wall of the annulus 8 and which is journaled in bearings 24 integrally formed in suitable spaced relation upon the upper end of a bracket 25 jointly mounted upon the axle 1 and king pin 6. For engagement with said king pin the bracket 25 has integral lugs 26 projecting outwardly from the bracket and respectively engaging between the upper and lower forks 2 of the axle and the bearings 11 and 12 of the brake shoe support 8, 9. Said bracket rests against the rear face of the axle extremity and is formed with an integral hook 27 which engages the front face of the axle so that said bracket is restrained by the axle from swinging either forwardly or rearwardly around the king pin 6. Thus, the bracket 25 is established in substantially a rigid relation with the axle and mounts the shaft 22 above the axle and substantially parallel to the latter. 28 is an actuating arm fast upon the inner end of the rock shaft 22. The cam 21, as is common practice, varies in diameter, its portion of minimum diameter engaging the brake shoes 13 when the latter are clear of the drum 7 and rotation of said cam in the proper direction from this normal position acting to progressively increase the diameter of the portion of the cam engaging said shoes so that the upper extremities of the shoes are progressively spread apart through rotation of said cam to accumulatively apply a braking force to the drum 7. When the travel of the vehicle equipped with the described mechanism is straight ahead or substantially so, a central surface portion 21$^a$ of the cam 21 engages a central end surface portion 29 of each brake shoe 13. Upon a limited turning movement of the front wheels, however, the surfaces 21$^a$ and 29 clear each other and since the lateral surface portions 21$^b$ and 30 of the cam 21 and brake shoes 13 are bevelled, said cam is no longer operative to subject the shoes 13 to a braking stress. Thus, it becomes impossible for a driver of a car equipped with the described brake mechanism to apply the front wheel brakes if the front wheels have been turned for steering purposes through more than a predetermined slight angle. Also, it will be evident that if the front wheels are turned for steering purposes subsequent to an application of the described brakes, a steering movement of said wheels through the predetermined angle will effect an automatic release of the brakes. Thus, the invention eliminates the danger arising from an interference by the front wheel brakes with a proper functioning of said wheels for steering purposes. Preferably the annulus 8 is formed with projecting horizontal flanges 31 respectively above and below the shaft 22 to assist in properly positioning said shaft with respect to the brake shoes, said flanges being marginal to the slot 23.

It is a feature of the invention as so far described that the bracket 25, which mounts the controlling rock shaft 22, and the brake shoe support 8, 9, are readily attachable to a vehicle originally equipped with rear wheel brakes only, the brake drum 7 also being obviously easily attachable to any front wheel. Thus, it is made possible to equip cars already in use with the improved front wheel brakes, the only necessary alteration in the original construction being the employment of longer king pins 6 so that the ends thereof may project above and below the axle forks 2 to mount the bracket 25 and brake shoe supports 8, 9.

Considering now more especially the common control means for the front and rear wheel brakes, as illustrated in Figures 5, 6 and 7, 32 designates the frames of a motor vehicle, 33 the front wheels thereof and 34 the rear wheels. The invention mounts a rock shaft 35 transversely upon the center portion of the frame in bearings 36, said shaft carrying a pair of terminal downwardly projecting arms 37 from which pull rods 38 extend to the front wheel brake mechanisms, and a pair of upwardly extending arms 39 are also mounted fast upon said rock shaft for engagement by pull rods 40 leading to the rear wheel brake mechanisms. An arm 41, rigidly projecting upward upon the central portion of said shaft, is connected by a link 42 and a foot pedal lever 43. Thus, by pressure upon the pedal of said lever, the shaft 35 is adapted to be so rocked as to exert a rearward pull upon the rods 38 leading to the front wheel brakes and a forward pull upon the rods 40 leading to the rear wheel brakes. The connections between the arms 37 and 41 and the rods 38 and 40 are such as to provide for a slight lost motion between said arms and rods such as will take care of any slight inaccuracy of adjustment. Thus, the arms 37 and 39 are terminally formed with sleeves 44 transverse to said arms in which sleeves are slidably mounted pin 45 pivotally connected to heads 46 in which the corresponding rods 38 or 40 are screw threaded. The pins 45 carry coil springs 46$^a$ compressed between nuts 47 and the bearings 44. Said springs are sufficiently stiff so that they will not appreciably yield as the brakes are being applied, provided the brakes respond uniformly to the force applied at the foot pedal. If, however, through some inaccuracy of adjustment any one or more of the brakes takes full effect somewhat in advance of the remaining brake or brakes, the spring 46$^a$ associated with the control rod 38 or 40 of any brake thus applied in advance of the other will yield sufficiently to the progressive pressure applied at the foot pedal so as to permit the remaining brakes to be subsequently fully applied. Thus, the described control mechanism compensates for any slight inaccuracy in the connections to the respective brakes by insuring that a full braking force may be applied at each wheel even though this force at some of the wheels may slightly exceed that at others.

What I claim as my invention is:—
1. In a brake mechanism, the combination with a vehicle wheel swivelled for a steering movement about a substantially vertical axis, of a pair of complementary engaging braking elements, one of which is mounted upon the wheel to turn therewith and the other of which is fixed as regards rotation of the wheel but is free to swivel with the wheel, an actuating member for the non-rotating brake element fixed with respect to the swivel movement of the wheel and of said element and automatically disengageable from said element through a predetermined swivel movement of the latter.

2. In a braking mechanism, the combination with a vehicle wheel rotatively mounted and also swivelled upon a substantially vertical axis for steering movement, of a pair of complementary engageable brake elements, one of which is mounted fast upon said wheel to rotate therewith, while the other is fixed as regards rotation of the wheel but is mounted to swivel in unison with the wheel, an actuating member for the last mentioned brake element fixed as regards the swivel movement of the wheel and of said element, said member and the engaged brake element having bearing faces coacting to apply the brake in the position of the wheel for straight ahead travel, said faces automatically disengaging and relieving braking pressure through a predetermined swivel steering movement of the wheel, and swivel brake elements in either direction.

3. In a brake mechanism, the combination with a vehicle wheel rotatively mounted and swivelled upon a substantially vertical axis for steering movement, of a pair of coacting brake elements, one of which is mounted fast upon said wheel to rotate therewith, while the other is fixed as regards rotation of the wheel but is swivelled to turn in unison with the wheel, and a rotative actuating member bearing upon one of said elements, said member having a central bearing face, and bevelled faces at each side of said central face whereby, upon a predetermined swivel movement of the wheel and the swivelled brake element, the latter clears the bearing face of said actuating member relieving any braking pressure that may have been applied.

4. In a brake mechanism, the combination with a vehicle wheel rotatively mounted and swivelled upon a substantially vertical axis for steering movement, of a brake drum carried by said wheel, a brake shoe interiorly engageable with said drum, a mounting for said shoe fixed as regards rotation of the wheel but swivelled to turn with the wheel upon steering movement thereof, a cam mounted rotatively and independently of both the steering movement and rotation of the wheel, said cam being engageable with said brake shoe to actuate the latter, the bearing portion of the cam and the engaging end of the brake shoe being fashioned to ride clear of each other upon a predetermined swivel movement of said shoe.

5. In a brake mechanism, the combination with a vehicle wheel rotatively mounted and also swivelled upon a substantially vertical axis for steering movement, a brake drum carried by said wheel, a pair of brake shoes interiorly engageable with said drum, and a common actuating member for said shoes mounted between spaced adjoining ends thereof, said member having opposed bearing faces for engagement with said shoes and having adjacent bevelled faces whereby upon a predetermined swivel movement of the wheel and shoes the latter automatically ride clear of said actuating member.

6. In a brake mechanism, the combination with a vehicle wheel rotatively mounted and swivelled upon a substantially vertical axis for steering movement, of a brake drum carried by said wheel, a pair of brake shoes interiorly engageable with said drum, a mounting for said brake shoes rigid with the wheel in the steering movement thereof, and a common actuating member for the brake shoes engaging between spaced ends thereof, said member being stationary with respect to the swivel movement of the shoes, said member and the shoes having bearing faces engageable upon actuation of said member during straight ahead travel of the vehicle, said shoes and actuating member having bevelled faces adjoining their bearing faces whereby the latter faces ride clear one of the other upon a predetermined swivel steering movement of the wheel.

7. In a brake mechanism, the combination with a vehicle wheel and an axle, of a pin swivelling said wheel for steering movement, a brake drum attached to said wheel, a brake shoe interiorly engageable with said drum, a mounting for said shoe swivelled upon said pin, an actuating shaft for said shoe, and a mounting for said shaft rigidly and detachably engaging said axle and having a portion engaging said pin.

In testimony whereof I affix my signature.

WILLIAM LINCOLN MARTIN.